2,749,507

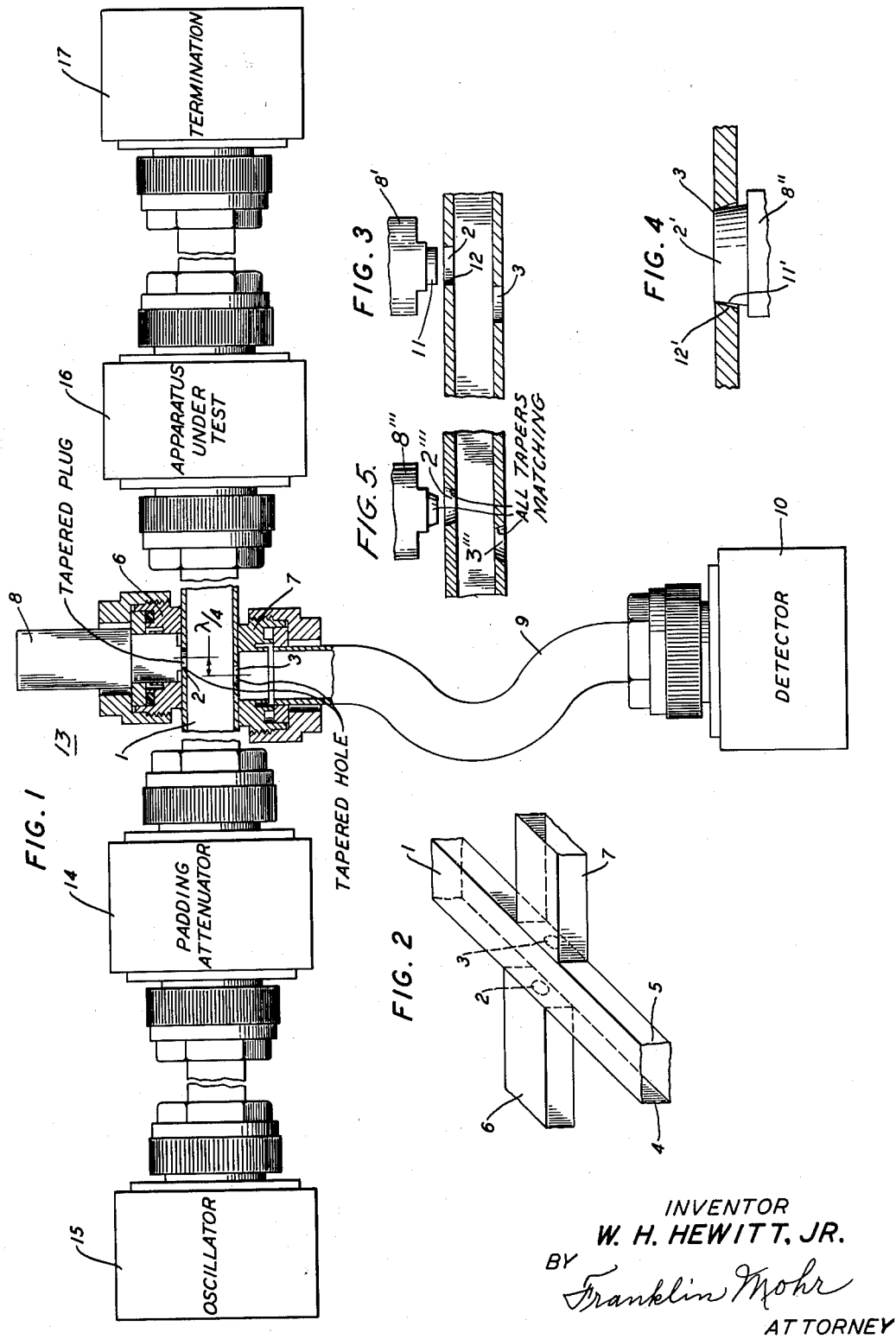
INVENTOR
W. H. HEWITT, JR.
BY Franklin Mohr
ATTORNEY

MEASURING APPARATUS FOR WAVE GUIDES

William H. Hewitt, Jr., Mendham, N. J., assignor to Bell Telephone Laboratories, Incorporated, New York, N. Y., a corporation of New York Application March 27, 1951, Serial No. 217,723

1 Claim. (Cl. 324—58)

This invention relates to electromagnetic measuring and testing equipment and more particularly to a standing wave detector for use in ultra high frequency wave guides.

In accordance with the invention two coupling apertures are provided in the walls of a length of wave guide, the apertures being spaced a quarter of a wavelength apart longitudinally with respect to the axis of the wave guide and on opposite walls thereof. Only one of the apertures is to be used for measuring purposes at any given time, while the other aperture is plugged to avoid stray reflected or radiated waves. The apertures and plugs are preferably conical for good mechanical fit and resultant high conductivity. The apertured wave guide is set up in a measuring system between a wave generator and a line with a movable short circuiting device and apparatus to be tested may be inserted between the apertured wave guide and the short circuiting device. Separate measurements upon standing waves in the wave guide may be made at the two apertures by adjustment of the movable short circuiting device. These values are then averaged to reduce effects of residual unwanted wave reflections.

In the drawings,

Fig. 1 is a diagram showing a wave guide system, partly schematically and partly in section, embodying the invention as part of a test line;

Fig. 2 is an isometric view of the basic arrangement of main and branch wave guides as employed in the system of Fig. 1;

Fig. 3 is an enlarged elevational view, partly in section, showing one form of plug and apertures useful in practicing the invention and having straight sides;

Fig. 4 is an enlarged elevational view, partly in section, showing an alternative form of plug and aperture having tapered sides; and Fig. 5 is an enlarged elevational view, partly in section, showing another alternative form of plug and apertures with matching tapers.

The testing system of Fig. 1 employs the basic arrangement of Fig. 2 consisting of a longitudinal piece of conductively walled wave guide 1 such as a wave guide of the hollow pipe type with two similarly shaped apertures 2 and 3 on opposite narrow sides 4 and 5 of the wave guide. These apertures, 2 and 3, are located a quarter of a wavelength apart longitudinally along the wave guide 1. They are connected to auxiliary wave guides 6 and 7, at right angles to the main wave guide 1. The centers of the apertures 2 and 3 are preferably located at the geometrical centers of the auxiliary wave guides 6 and 7. In accordance with the invention a plug 8 which may be solid and is conductively surfaced is placed in one of the apertures 2 or 3 employing the auxiliary wave guide 6 or 7 associated with the aperture 2 or 3 as a mechanical guide. For this purpose the wave guides 6 and 7 may be short. A flexible piece of wave guide 9 going to a wave guide frequency detector 10 is connected to the remaining open aperture 2 or 3 via the auxiliary wave guide 6 or 7 associated with the open aperture 2 or 3. Fig. 3 shows the apertures 2 and 3 and the plug 8' as having straight sides 11 and 12. Fig. 4 shows a single aperture 2' and a plug 8' with tapered sides, 11' and 12'.

The double hole standing wave detector 13 in accordance with the invention is shown in the testing system or test line of Fig. 1. Associated with the double hole standing wave detector 13, in the test line are a wave guide frequency oscillator 15, a padding attenuator 14, the apparatus 16 under test, and a variable position short circuiting termination 17. The short circuiting termination 17 is adjustable longitudinally along the wave guide to control the position of the standing wave in the apparatus 16 under test and the double hole standing wave detector 13. This type of standing wave detector gives greatest accuracy when used to measure the standing waves of apparatus having relatively low loss. It may be used for measuring attenuation of low loss apparatus by the effect of this attenuation on the standing wave ratio set up by the shorting termination 17.

Prior to the present invention, the flexible wave guide 9 was connected to one of the apertures, 2 or 3, via the associated auxiliary wave guide 6 or 7, leaving the remaining aperture 2 or 3 and the associated auxiliary wave guide 6 or 7 open. The termination 17 was adjusted to move the standing wave pattern along the axis of the wave guide 1 so as to locate a minimum voltage of the standing wave at the aperture 3 connected to the flexible wave guide 9 and in turn to the detector 10. The purpose of this connection was to use the detector 10 for measuring the voltage at the aperture 3 in the main wave guide 1. Then the termination 17 was readjusted to give maximum voltage at the aperture 3 by means of the voltage indicated on the detector 10. Next, the flexible wave guide 9 was disconnected from aperture 3 and connected to aperture 2. The termination 17 was then readjusted to give minimum voltage at the aperture 2 in the main wave guide 1 as indicated by the detector 10 connected to aperture 2 by means of the flexible wave guide 9. The difference in the magnitudes of the maximum and the minimum measured with either aperture 2 or 3, is an indication of the standing wave ratio. An averaging of the standing wave ratio obtained with both apertures 2 and 3 will give a more nearly accurate value than may be obtained using either aperture alone. For calibrating the standing wave ratio set up by the termination 17, a similar procedure was followed, with the exception that the apparatus 16 under test was removed from the line and the termination 17 was connected directly to the double hole standing wave detector 13. The difference of the standing wave ratios obtained with the termination 17, only and with both the termination 17 and the apparatus under test, is a measure of the attenuation of the apparatus under test.

With the procedure just described one of the apertures 2 or 3 was always open. Because of this, an error was introduced in the measured value by leakage through the open aperture, especially if the maximum voltage position instead of the minimum was located at the open aperture 2 or 3. This error was present in both the measurement of the apparatus 16 under test and the calibration of the termination 17. In accordance with the invention, to decrease these errors of measurement and calibration, the plug 8 is inserted in the open aperture 2 or 3 when the other aperture 3 or 2 is connected to the detector 10 via the flexible wave guide 9.

The plug 8 and the apertures 2 and 3 may have straight sides 11 and 12 as shown in Fig. 3 or a plug 8' with tapered sides 11', may be employed with an aperture with tapered sides 12' to improve the contact. When the tapered sides 11' and 12' are used, the taper 11' of the plug 8' may be made different from the slope 12' of the aperture as shown in Fig. 4 to insure a particularly good contact. Preferably the taper of the aperture is sharper than that of the plug. For good transmission conditions within the wage guide, a uniform surface is desirable and for that reason it is advantageous that the surface of the face of the plug be flush with the inner surface of the wave guide when the plug is firmly seated.

It is to be understood that the above-described arrangements are illustrative of the principles of the invention. Numerous other arrangements may be devised by those skilled in the art without departing from the spirit and scope of the invention.

What is claimed is:

A standing wave measuring system for use with hollow-pipe wave guide, comprising a source of electromagnetic waves, a hollow-pipe wave guide coupling section connected at one end to said source and adapted for connection at the other end to the input side of apparatus to be tested, said coupling section having two coupling apertures therein; a detector, a wave guide connected at one end to the detector and adapted to be removably coupled at the other end to said coupling section through one of said coupling apertures, a removable plug in the other of said coupling apertures, said plug having a conductive face that is flush with the inner surface of the wave guide when the plug is firmly seated, and a variable position short circuiting device connected to the output side of the apparatus to be tested, whereby the position of a maximum or minimum portion of a standing wave pattern in the system may be moved longitudinally of the system and adjusted to coincide with the location of a selected one of said coupling apertures while substantially avoiding both reflection and radiation at the plugged aperture.

References Cited in the file of this patent

UNITED STATES PATENTS

| | | |
|---|---|---|
| 523,955 | Bates | July 31, 1894 |
| 1,255,175 | Kellogg | Feb. 5, 1918 |
| 1,588,183 | Goddard | June 8, 1926 |
| 1,592,382 | Munn | July 13, 1926 |
| 2,133,917 | Clifton | Oct. 18, 1938 |
| 2,219,653 | Krugel | Oct. 29, 1940 |
| 2,442,190 | Fiske | June 17, 1947 |
| 2,475,464 | Shankweiler | July 5, 1949 |
| 2,557,180 | Fiske | June 19, 1951 |
| 2,564,007 | Hochgraf | Aug. 14, 1951 |
| 2,605,323 | Samuel | July 29, 1952 |

FOREIGN PATENTS

| | | |
|---|---|---|
| 567,287 | Great Britain | Feb. 7, 1945 |